United States Patent
Chen et al.

(10) Patent No.: US 7,036,119 B1
(45) Date of Patent: Apr. 25, 2006

(54) METHOD AND APPARATUS FOR CREATING A NETWORK TOPOGRAPH THAT INCLUDES ALL SELECT OBJECTS THAT ARE IN A NETWORK

(75) Inventors: Shigang Chen, Santa Clara, CA (US); Branimir Liker, San Jose, CA (US); Partha Bhattacharya, Cupertino, CA (US); Imin Lee, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 619 days.

(21) Appl. No.: 10/197,301

(22) Filed: Jul. 15, 2002

(51) Int. Cl.
  *G06F 9/45* (2006.01)

(52) U.S. Cl. .................. 717/162; 709/224; 715/140

(58) Field of Classification Search ........ 713/157–201; 709/204–229; 717/162–167; 715/140; 370/254
See application file for complete search history.

(56) References Cited

U.S. PATENT DOCUMENTS

| | | | |
|---|---|---|---|
| 6,225,999 B1 | 5/2001 | Jain et al. | 345/356 |
| 6,484,261 B1* | 11/2002 | Wiegel | 713/201 |
| 6,871,284 B1* | 3/2005 | Cooper et al. | 713/200 |
| 2003/0070070 A1* | 4/2003 | Yeager et al. | 713/157 |
| 2003/0172145 A1* | 9/2003 | Nguyen | 709/223 |
| 2003/0221004 A1* | 11/2003 | Stupek et al. | 709/224 |
| 2004/0030796 A1* | 2/2004 | Cooper et al. | 709/231 |
| 2005/0086300 A1* | 4/2005 | Yeager et al. | 709/204 |

* cited by examiner

*Primary Examiner*—Kakali Chaki
*Assistant Examiner*—Mark Francis
(74) *Attorney, Agent, or Firm*—Hickman Palermo Truong & Becker, LLP

(57) ABSTRACT

A method is disclosed for creating a network topograph that includes all select objects that are in a network. A set of one or more non-select objects in the network is determined. A network topograph is created. Each select object in the network is included in the network topograph. Elements of the set are collectively represented as a single non-select object.

21 Claims, 5 Drawing Sheets

METHOD AND APPARATUS FOR CREATING A NETWORK TOPOGRAPH THAT INCLUDES ALL SELECT OBJECTS THAT ARE IN A NETWORK

FIELD OF THE INVENTION

The present invention generally relates to graphical representation of computer networks. The invention relates more specifically to a method and apparatus for creating a network topograph that includes all select objects that are in a network.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Networks include network objects such as firewalls, routers, and servers. The manner in which network objects are linked together is commonly referred to as a network topology. A network topograph graphically represents a network topology. A user may view a network topograph in a graphical user interface of a network management application as displayed on a computer monitor.

Networks may include many network objects. Some networks include thousands of network objects. Due to the usually constrained viewing areas of computer monitors, a network topograph for such a large network on a monitor could be displayed in one of several ways.

One way of displaying such a topograph involves displaying the entire topograph within the monitor's viewing area. This is accomplished by scaling down the dimensions of the visual representations of the objects and links in the topograph. This approach may be referred to as a scaling approach. Unfortunately, if the network is sufficiently large, then the scaled representations of the objects and links in the topograph may become illegible or indistinguishable from one another, defeating the purpose of the topograph.

Another way of displaying such a large topograph involves displaying only a sub-area of the topograph on the monitor. In this way, a user may employ scrolling controls, apparent in the graphical user interface or otherwise known to the user, to select the specific sub-area. This approach may be referred to as a scrolling approach. Unfortunately, this places the burden of visualizing the entire network topology on the mind of the user, defeating the purpose of the topograph.

Yet another way of displaying such a large topograph involves organizing the network topology as a tree structure. Network objects are represented as nodes of such a tree structure. Child nodes of a parent node represent network objects that are directly linked to the network object represented by the parent node. By selecting a parent node, a user may reveal or conceal the child nodes of a revealed parent node. This approach may be referred to as a tree structure approach. Unfortunately, the placement of nodes as children or parents relative to each other may have little or no relation to the actual topology of the network. Therefore, locating desired information in the tree structure is often a frustrating task.

Another way of displaying such a large topograph involves partitioning the topograph with a grid. The contents of each square in the grid may be scaled or otherwise abstractly represented. Thus, the entire grid may be displayed within an interface, although the contents of each grid square may not be determinable from the display of the entire grid. A user may select one grid square to obtain an explosive view that includes the contents of that grid square. This approach may be referred to as a grid approach. Unfortunately, the inclusion of network objects within any given grid square may have little or no relation to the actual topology of the network. Therefore, locating desired information in the grid is often a frustrating task.

Finally, another way of displaying such a large topograph involves displaying only select routers of the represented network within an overall display of the topograph. Network objects connected to a displayed router may be obscured in the overall display. A connection of such obscured objects to a displayed router may be indicated in the overall display by modifying the color of that router. By selecting an indicatively colored router, a user may reveal the formerly obscured objects connected to that router. This approach may be referred to as a router display approach.

Unfortunately, while the overall display may show links that indicate an ultimate accessibility between routers (possibly through other obscured network objects), the overall display does not necessarily show direct connections between network objects. For purposes (e.g., security management) in which a user needs to determine all direct connections, in a network, between network objects of a certain kind (e.g., firewall objects) and network objects not of that kind, the router display approach is less than perfect.

Based on the foregoing, there is a clear need for a way in which a user may efficiently determine all direct connections, in a network, between network objects of a certain kind and network objects not of that kind.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
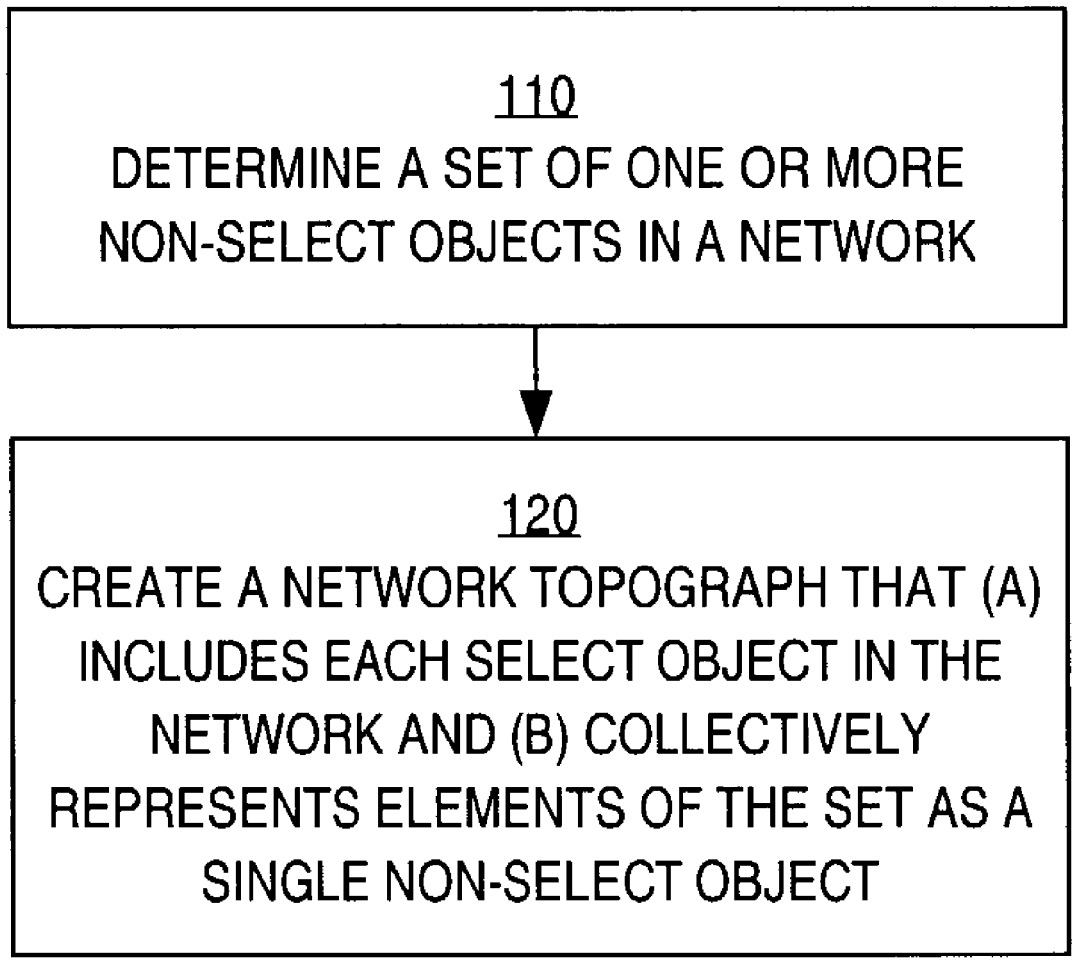
FIG. 1 is a flow diagram that illustrates a high level overview of one embodiment of a method for creating a network topograph that includes all select objects that are in a network.

A method and apparatus for creating a network topograph that includes all select objects that are in a network is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Functional Overview
3.0 Method of Creating a Network Topograph
    3.1 Process of Determining a Set of Objects that are not Key Firewall Objects
    3.2 Example Network Topograph
4.0 Implementation Mechanisms - Hardware Overview
5.0 Extensions and Alternatives 1.0 General Overview The needs identified in the foregoing Background, and other needs and objects that will become apparent for the following description, are achieved in the present invention, which comprises, in one aspect, a method for creating a network topograph that includes all select objects in a network. A set of one or more non-select objects in the network is determined. A network topograph is created. Each select object in the network is included in the network topograph. Elements of the set are collectively represented as a single non-select object.

In other aspects, the invention encompasses a computer apparatus, a computer readable medium, and a carrier wave configured to carry out the foregoing steps.

In contrast to a technique taught herein, the scaling and scrolling approaches, described above, include all objects of a network in a topograph.

In contrast to a technique taught herein, the tree structure and grid approaches, described above, do not contemplate any notion of select and non-select objects. Even if the objects revealed and obscured in a topograph are considered to be select and non-select objects, respectively, then only a select object could represent any set of non-select objects in the topograph according to the tree structure and grid approaches.

In contrast to a technique taught herein, the router display approach, described above, does not collectively represent a set of non-select objects as a single non-select object in a topograph. Even if routers are considered to be select objects, then only a select object could represent any set of non-select objects in the topograph according to the router display approach.

Through a technique taught herein, a user may efficiently determine all direct connections, in a network, between network objects of a certain kind and network objects not of that kind. This technique allows a user to view, within a single graphical user interface, only and all of those relationships, between network objects, that are of relatively greater importance to a selected purpose. This technique uses a logical structure, such as is inherent in a network topology, to create a network topograph that hierarchically displays topological information.

2.0 Functional Overview

FIG. 1 is a flow diagram that illustrates a high level overview of one embodiment of a method for creating a network topograph that includes all select objects that are in a network. In block 110, a set is determined. The set comprises one or more non-select objects that are in a network. Non-select objects may include any network objects that are not select objects. In one embodiment, select objects are firewall objects, and non-select objects are network objects that are not firewall objects. In another embodiment, select objects are key firewall objects, and non-select objects are objects that are not key firewall objects. In still other embodiments, select objects may have other attributes.

The set may be referred to as a perimeter, where that perimeter is a piece of the network that is completely surrounded by select objects. In other words, the select objects included in the network effectively partition the network into perimeters.

In block 120, a network topograph is created. The network topograph includes each select object that is in the network. The network topograph also collectively represents elements of the set as a single non-select object.

The single non-select object may be referred to as a perimeter node. The process of collectively representing elements of the set as a single non-select object may be referred to as "folding" a perimeter "into" a perimeter node. In one embodiment, each perimeter in a network is folded into a perimeter node to create a resulting network topograph.

In this way, important relationships, such as those between select objects and the single non-select object representing the set, may all be legibly displayed within an area of limited size. Less important relationships, such as those between non-select objects within the set, may be obscured.

3.0 Method of Creating a Network Topograph

Figure 2:
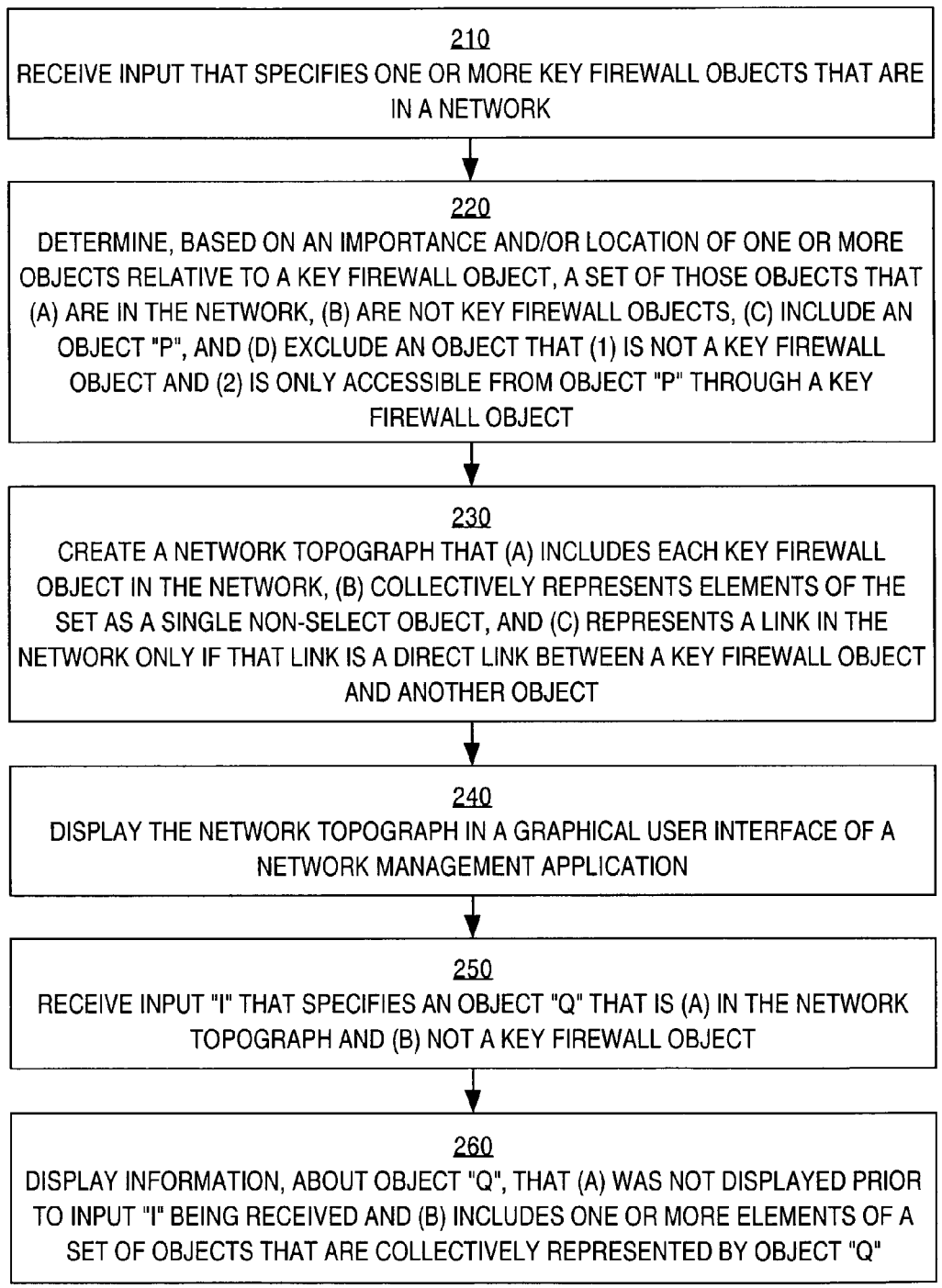
FIG. 2 is a flow diagram that illustrates one embodiment of a method for creating a network topograph that includes all key firewall objects that are in a network.

FIG. 2 is a flow diagram that illustrates one embodiment of a method for creating a network topograph that includes all key firewall objects that are in a network. In block 210, input is received that specifies one or more key firewall objects that are in a network. A key firewall object is a firewall object that has been designated as a key firewall object. The input may be received from a user, another program, an external system, a configuration file, etc.

For example, all firewall objects may be designated key firewall objects. For another example, a user of a network management application may designate one or more firewall objects as key firewall objects by selecting the objects (e.g., by some unique identifiers associated with those objects) in a graphical user interface. For another example, firewall objects that meet some criteria that are provided by a user may be designated key firewall objects. As yet another example, key firewall objects represent select firewalls that control traffic to regions of special interest in the network.

A sub-network topograph may be created according to different criteria than criteria according to which a network topograph was created. Such a sub-network topograph may be embedded within a perimeter node of a network topograph. In this manner, a hierarchy of network topographs, of any hierarchical depth, may be formed.

Criteria used to define key firewall objects may be predetermined. For example, predetermined criteria may define key firewall objects as firewall objects that are between (a) autonomous domains of an internet, (b) geographic locations, (c) departments of a business, (d) political entities such as states and nations, and (e) levels of a tree structure. Different predetermined criteria may be applied between two different hierarchical levels of representation while applying common predetermined criteria to each topograph at a given hierarchical level.

In block 220, a set is determined based on an importance of one or more objects relative to a key firewall object. For example, regarding security management purposes, servers and routers may be determined to be of less importance than firewall objects generally. The set is a set of one or more objects that are in the network. The set includes an object "P". The set also excludes an object. The excluded object is not a key firewall object. The excluded object is only accessible from object "P" through a key firewall object. None of the objects in the set are key firewall objects. In one embodiment, the set may include firewall objects that are not key firewall objects. In one embodiment, the set is determined based on a location of one or more objects relative to a key firewall object.

In block 230, a network topograph is created. The network topograph includes each key firewall object in the network. The network topograph collectively represents elements of the set as a single non-select object. In other words, the network topograph, as initially created, does not represent individual elements of the set separately from each other. The network topograph represents a link that is in the network only if that link is a direct link between a key firewall object and another object. In other words, direct links between two objects that are not key firewall objects are not represented in the network topograph. Indirect links between two objects are also not represented in the network topograph.

In block 240, the network topograph is displayed in a graphical user interface of a network management application. Block 240 is optional; in other embodiments, the network topograph that was created in block 230 is used programmatically, and is not displayed.

In block 250, input "I" is received. The input "I" specifies an object "Q" that is in the network topograph. The object "Q" is not a key firewall object.

In block 260, information is displayed about the object "Q". The information was not displayed prior to the input "I" being received. In other words, the information is displayed in response to the input "I" being received. The information includes one or more elements of a set of objects collectively represented by the object "Q".

Blocks 250–260 are optional, and are omitted in certain embodiments. Further, blocks 250–260 may be performed any number of times without re-performing any of blocks 210–240.

3.1 Process of Determining a Set of Objects that are not Key Firewall Objects

Figure 3:
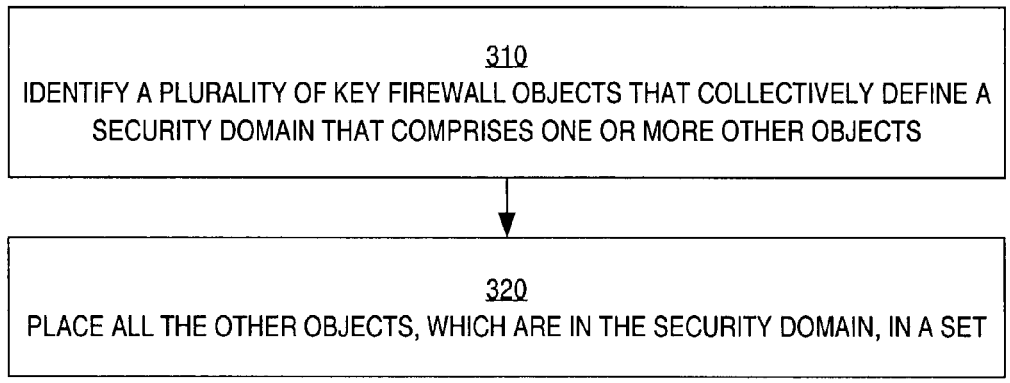
FIG. 3 and FIG. 4 are flow diagrams that illustrate embodiments of a method for determining a set of one or more objects, in a network, that are not key firewall objects.
Figure 4:
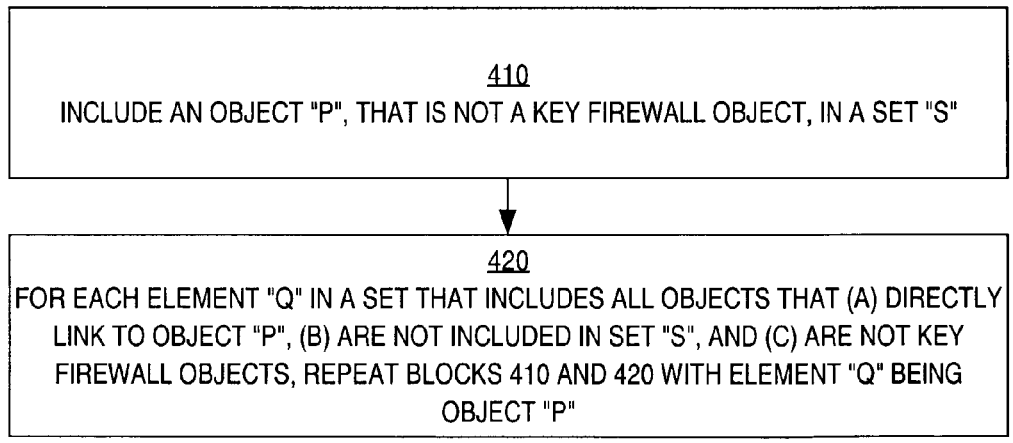

FIG. 3 and FIG. 4 are flow diagrams that illustrate embodiments of a method for determining a set of one or more objects, in a network, that are not key firewall objects. Referring to FIG. 3, in block 310, a plurality of key firewall objects is identified. The objects collectively define a security domain that comprises one or more other objects. In other words, the security domain is a perimeter as described above.

In block 320, all of the other objects, which are in the security domain, are placed in a set. Elements of the set may be represented, in a network topograph, as a single object that is not a key firewall object.

Referring to FIG. 4, in block 410, an object "P" is included in a set "S". The object "P" is not a key firewall object. For example, object "P" may be an object randomly selected from many objects in a network.

In block 420, for each element "Q" in a set that includes all objects that (a) directly link to the object "P", (b) are not included in the set "S", and (c) are not key firewall objects, blocks 410 and 420 are recursively repeated with that element "Q" being the object "P".

For example, in one embodiment, a depth-first search of a network is performed. Whenever that search locates an object that is not a key firewall object, that object is included in the set "S". The search proceeds to each boundary of a perimeter that is surrounded by key firewall objects. When the search has traversed every object in the perimeter, the resulting set "S" includes objects that may be represented, in a network topograph, as a single object that is not a key firewall object. In one embodiment, this search is performed within each perimeter of a network.

3.2 Example Network Topograph

Figure 5:
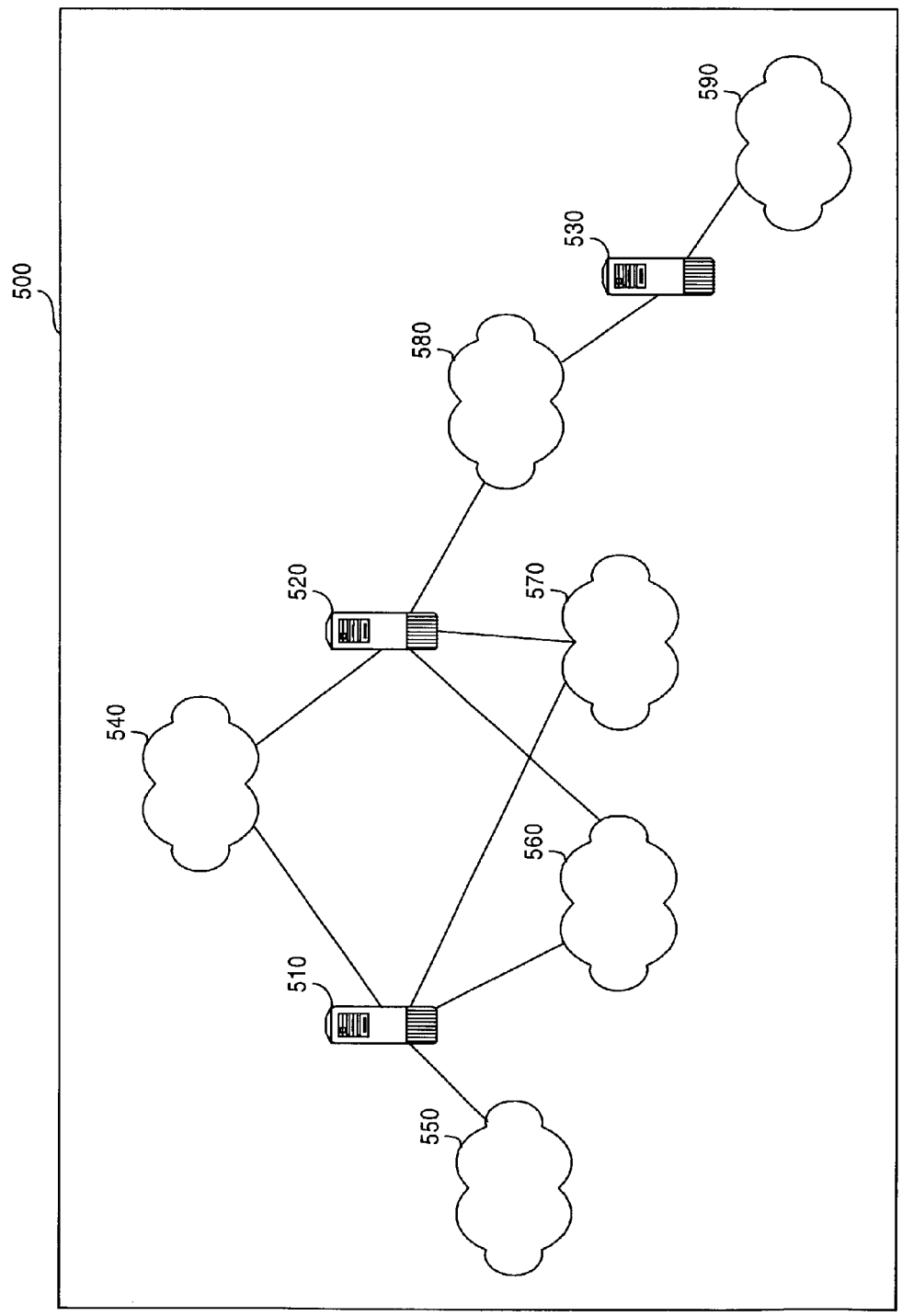
FIG. 5 is a block diagram that illustrates a network topograph created according to one embodiment of a method for creating a network topograph that includes all key firewall objects that are in a network.

FIG. 5 is a block diagram that illustrates a network topograph created according to one embodiment of a method for creating a network topograph that includes all key firewall objects that are in a network. Network topograph 500 includes key firewall objects 510–530. Key firewall objects 510–530 are the only key firewall objects included in the network represented by network topograph 500. Network topograph 500 also includes perimeter nodes 540–590. Each one of perimeter nodes 540–590 represents a set, specific to that perimeter node, of one or more obscured objects that are not key firewall objects.

Network topograph 500 shows perimeter node 540 directly linked to key firewall objects 510 and 520. Therefore, in the network that is represented by network topograph 500, some object represented by perimeter node 540 directly links to key firewall object 510, and some (possibly different) object represented by perimeter node 540 directly links to key firewall object 520. Key firewall object 510 is also directly linked to perimeter nodes 550, 560, and 570. Key firewall object 520 is also directly linked to perimeter nodes 560, 570, and 580. Perimeter node 580 is also directly linked to key firewall object 530. Key firewall object 530 is also directly linked to perimeter node 590.

Two objects represented by a same perimeter node are capable of accessing each other exclusive of a key firewall object. Two objects represented by different perimeter nodes are capable of accessing each other, if at all, only through a key firewall object. For example, in this instance, an object represented by perimeter node 540 is capable of accessing an object represented by perimeter node 590 only through key firewall objects 520 and 530 (and possibly other objects represented by perimeter nodes 540, 580, and 590).

In one embodiment, selecting one of perimeter nodes 540–590 causes a set of objects that are collectively represented by that perimeter node to be displayed, along with information that indicates the relationships between the objects in that set. In one embodiment, such information may comprise a sub-network topograph relative to which key firewall objects have been defined differently than those defined relative to network topograph 500. For example, network topograph 500 may define key firewalls as being all firewalls between autonomous domains of an internet, and a sub-network topograph may define key firewalls as being all firewalls within one such domain.

Network topograph 500 may be legibly displayed through a graphical user interface of a network management application. Such a graphical user interface may be displayed, for example, on a 17" monitor. Alternatively, network topograph 500 may be printed on a single sheet of 8.5" by 11" paper. Descriptive text may be legibly displayed with each of objects 510–590. In yet another alternative, the topograph is represented in data values that are stored in one or more data structures, which are used by a network management system or by other programs or systems.

4.0 Implementation Mechanisms—Hardware Overview

Figure 6:
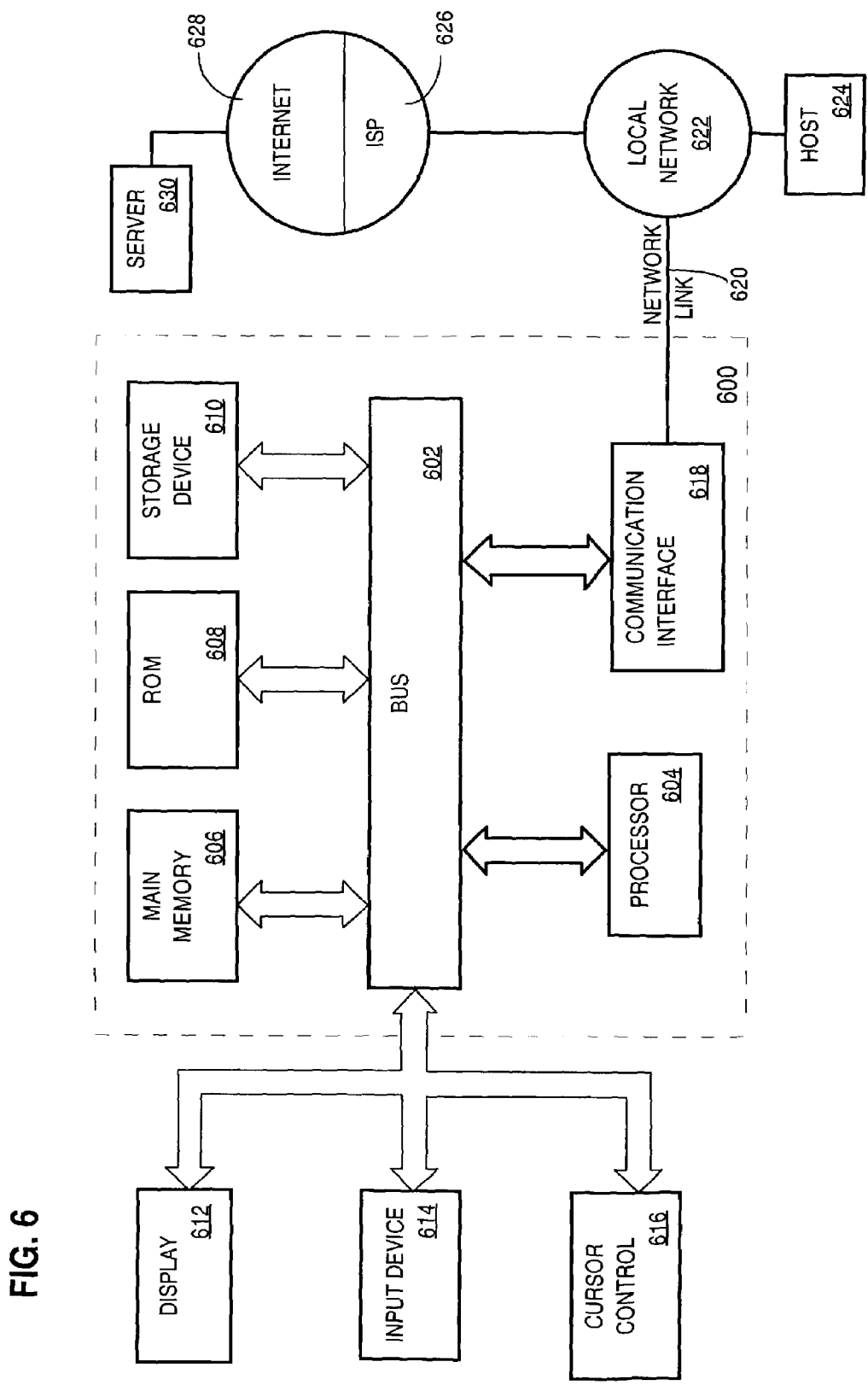
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for creating a network topograph that includes all select objects in a network. According to one embodiment of the invention, a network topograph is created by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for creating a network topograph as described herein.

Processor 604 may execute the received code as it is received, and/or stored in storage device 610, or other non-volatile storage for later execution. In this manner, computer system 600 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of creating a network topograph that includes all select objects that are in a network, the method comprising the computer-implemented steps of:
   determining a first set of one or more non-select objects in the network; and
   creating a network topograph that includes each select object in the network, wherein elements of the first set are collectively represented as a single non-select object;
   wherein determining the first set comprises performing recursive steps comprising:
   including a first non-select object in the first set; and
   for each element in a set that includes only non-select objects that (a) directly link to the first non-select object and that (b) are not included in the first set, performing the recursive steps with that element being the first non-select object.

2. A method as recited in claim 1, wherein creating the network topograph comprises representing, in the network topograph, a link in the network only if the link is a direct link between a select object and another object in the network.

3. A method as recited in claim 1, wherein determining the first set of one or more non-select objects in the network comprises determining the one or more non-select objects based on an importance of those one or more non-select objects relative to a select object.

4. A method as recited in claim 1, wherein determining the first set of one or more non-select objects in the network comprises determining the one or more non-select objects based on a location of those one or more non-select objects relative to a select object.

5. A method as recited in claim 1, further comprising the step of:
   receiving input from a user, wherein the input specifies one or more of the select objects.

6. A method as recited in claim 1, further comprising the step of:
   displaying the network topograph in a graphical user interface of a network management application.

7. A method as recited in claim 6, further comprising the steps of:
   receiving input from a user, wherein the input specifies a first non-select object in the network topograph; and
   displaying information about the first non-select object, wherein the information was not displayed prior to the input being received.

8. A method as recited in claim 7, wherein displaying information about the first non-select object comprises displaying one or more elements of a set of objects that are collectively represented by the first non-select object.

9. A method as recited in claim 1, wherein determining the first set comprises the steps of:
   identifying a plurality of select objects that collectively define a security domain that comprises one or more other objects; and
   placing all the other objects, which are in the security domain, in the first set.

10. A method of creating a network topograph that includes all key firewall objects that are in a network, the method comprising the computer-implemented steps of:
    determining a perimeter that includes one or more objects that are not key firewall objects, wherein the objects are in the network, wherein the perimeter includes a first object that is accessible from a second object that is not a key firewall object, wherein the second object is not within the perimeter, wherein the first object is accessible from the second object only through a first key firewall object; and
    creating a network topograph, wherein each key firewall object in the network is included in the network topograph, wherein objects within the perimeter are collectively represented as a single perimeter node;
    wherein determining the perimeter comprises performing primary steps, wherein the primary steps comprise:
    including the first object in the perimeter; and
    for each primary element in a primary set that includes only objects that (a) directly link to the first object, that (b) are not included in the perimeter, and that (c) are not key firewall objects, performing secondary steps, wherein the secondary steps comprise:
    including the primary element in the perimeter; and
    for each secondary element in a secondary set that includes only objects that (a) directly link to the primary element, that (b) are not included in the perimeter, and that (c) are not key firewall objects, including the secondary element in the perimeter.

11. A method as recited in claim 10, wherein creating the network topograph comprises representing, in the network topograph, a link in the network only if the link is a direct link between a key firewall object and another object in the network.

12. A method as recited in claim 10, wherein determining the perimeter comprises determining based on an importance, relative to a key firewall object, of objects potentially within the perimeter.

13. A method as recited in claim 10, wherein determining the perimeter comprises determining based on a location, relative to a key firewall object, of objects potentially within the perimeter.

14. A method as recited in claim 10, further comprising the step of:
    receiving input from a user, wherein the input specifies one or more of the key firewall objects.

15. A method as recited in claim 10, further comprising the step of:
    displaying the network topograph in a graphical user interface of a network management application.

16. A method as recited in claim 15, further comprising the steps of:
    receiving input from a user, wherein the input specifies a first perimeter node in the network topograph; and
    displaying information about the first perimeter node, wherein the information was not displayed prior to the input being received.

17. A method as recited in claim 16, wherein displaying information about the first perimeter node comprises displaying one or more objects within a perimeter that is represented by the perimeter node.

18. A method as recited in claim 10, wherein determining the perimeter comprises the steps of:
    identifying a plurality of key firewall objects that collectively define a security domain that comprises one or more other objects; and
    placing all the other objects, which are in the security domain, in the perimeter.

19. A computer-readable medium carrying one or more sequences of instructions for creating a network topograph that includes all select objects that are in a network, which instructions, when executed by one or more processors, cause the one or more processors to carry out the steps of:

determining a first set of one or more non-select objects in the network; and creating a network topograph, wherein each select object in the network is included in the network topograph, and wherein elements of the first set are collectively represented as a single non-select object;

wherein determining the first set comprises performing recursive steps comprising:
- including a first non-select object in the first set; and
- for each element in a set that includes only non-select objects that (a) directly link to the first non-select object and that (b) are not included in the first set, performing the recursive steps with that element being the first non-select object.

20. An apparatus for creating a network topograph that includes all select objects that are in a network, comprising:

means for determining a first set of one or more non-select objects in the network; and means for creating a network topograph, wherein each select object in the network is included in the network topograph, and wherein elements of the first set are collectively represented as a single non-select object;

wherein the means for determining the first set comprises means for performing recursive steps comprising:
- including a first non-select object in the first set; and
- for each element in a set that includes only non-select objects that (a) directly link to the first non-select object and that (b) are not included in the first set, performing the recursive steps with that element being the first non-select object.

21. An apparatus for creating a network topograph that includes all select objects that are in a network, comprising:

a processor; and one or more stored sequences of instructions, which, when executed by the processor, cause the processor to carry out the steps of:

determining a first set of one or more non-select objects in the network; and creating a network topograph, wherein each select object in the network is included in the network topograph, and wherein elements of the first set are collectively represented as a single non-select object;

wherein determining the first set comprises performing recursive steps comprising:
- including a first non-select object in the first set; and
- for each element in a set that includes only non-select objects that (a) directly link to the first non-select object and that (b) are not included in the first set, performing the recursive steps with that element being the first non-select object.

* * * * *